Patented June 23, 1931

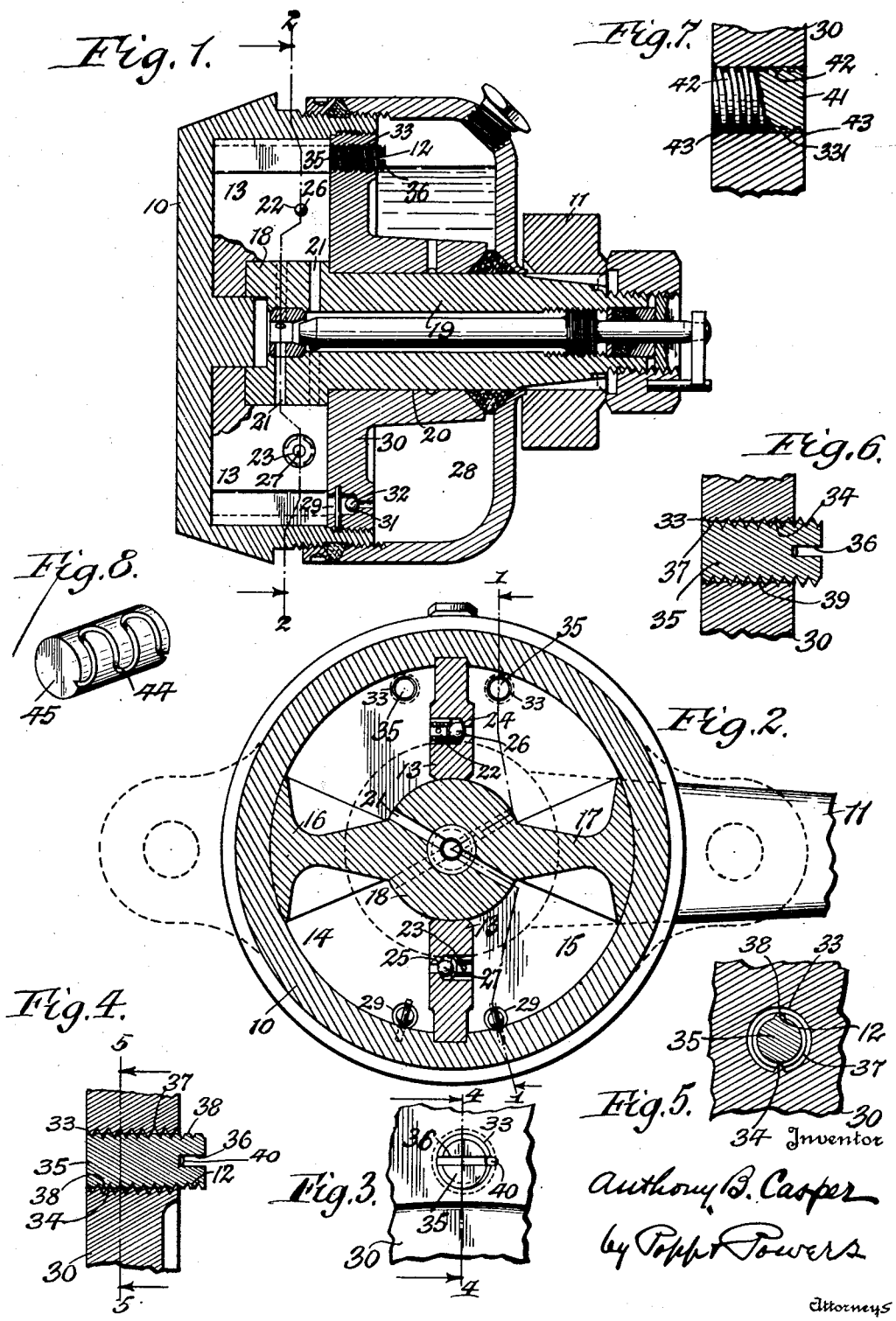

1,811,492

UNITED STATES PATENT OFFICE

ANTHONY B. CASPER, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed July 26, 1929. Serial No. 381,164.

This invention relates to a shock absorber and more particularly to a device of this character having a relatively movable working chamber and a piston between which a resistance liquid is interposed, and a replenishing chamber from which liquid is supplied to the working chamber as needed and into which some of the air mixed with the liquid in the working chamber is discharged.

Heretofore communication between the spaces in the upper parts of the working chamber and the replenishing chamber was effected by securing a plug with a friction fit in an opening in the wall or partition between the working chamber and the replenishing chamber which plug was provided on its side with a longitudinal groove of small cross section for the passage of liquid and air from the working chamber to the replenishing chamber. It was found, however, that this plug under extraordinary heavy pressure in the working chamber is liable to become displaced and that the vent formed by the groove in the plug must be so fine or small in cross section in order to properly retard the flow of liquid therethrough that the same is liable to become clogged by dirt or other impurities in the resistance liquid.

It is therefore the object of this invention to provide means for establishing communication between the working and replenishing chambers which are incapable of becoming displaced, which will permit ready escape of air from the working chamber to the replenishing chamber but will properly retard the flow of liquid from the working chamber to the replenishing chamber and still avoid the possibility of becoming clogged, and which can be economically manufactured and assembled. To that end this invention consists generally of a stopper or plug secured in a correspondingly shaped opening in the wall between the working and replenishing chambers and having their sides constructed to form a helical, devious or labyrinth passage between said chambers.

In the accompanying drawings:—

Figure 1 is a longitudinal section of a shock absorber embodying the preferred form of my invention, taken on line 1—1, Fig. 2.

Figure 2 is a cross section of the same taken on line 2—2, Fig. 1.

Figure 3 is a fragmentary elevation on an enlarged scale of the wall or partition between the working and replenishing chamber and the improved vent plug therein.

Figure 4 is a longitudinal section taken on line 4—4, Fig. 3.

Figure 5 is a cross section taken on line 5—5 Fig. 4.

Figure 6 is a sectional view similar to Fig. 4, but showing a modified form of the means for producing a helical vent passage between the working chamber and the replenishing chamber.

Figure 7 is a sectional view showing another form of my invention.

Figure 8 is a perspective view of a plug containing still another embodiment of my improvements.

In the following description similar characters of reference indicate like parts in the several figures of the drawings:—

In its general organization the shock absorber may be variously constructed but the form shown in the drawings, as an example, comprises a cylindrical hollow body or casing 10 adapted to be attached to one of the relatively movable members such as the chassis of an automobile, and a rock arm 11 adapted to be attached to the other relatively movable member, such as an axle of an automobile. The body in the present case is divided internally by diametrical vertical sections 13 of a partition into two segmental working chambers 14, 15. Within these working chambers are arranged two oscillating pistons 16, 17 the inner ends of which are mounted on a hub 18 engaging with the inner ends of the partition sections and formed on the inner end of a rock shaft 19 which is journaled in a bearing 20 in the inner wall 30 of the working chambers and which has its outer end connected with the rock arm 11.

The working chambers contain a liquid resistance medium such as oil, a certain amount of which is permitted to flow back and forth between these chambers through by-pass ducts 21 in the hub of the piston so that the movement of the pistons at no time encounters a dead resistance. As shown in Fig. 2 the high and low pressure ends of the working chamber 14 are above and below the left piston 16 and the high and low pressure ends of the working chamber 15 are below and above the right piston 17. When the pistons move backwardly or toward the low compression ends of their respective working chambers, as is the case when the springs of the automobile are compressed upon striking an obstruction in the road, the resistance liquid in the low pressure end of each working chamber is permitted to flow with comparative freedom into the adjacent high pressure end of the other working chamber so as to offer only a moderate resistance to the movement of the pistons at this time. When, however, the pistons move forwardly in the working chambers from the low pressure ends to the high pressure ends of the same, as occurs during the rebound of the automobile springs after compression of the same, then the flow of the resistance liquid from the high pressure end of each working chamber to the low pressure end of the other working chamber is checked so as to offer a greater liquid resistance to the movement of the pistons and operate to absorb the shock which is produced at this time. This alternate free and checked flow of the resistance liquid is preferably obtained by providing the upper and lower partition sections with ports 22, 23 which contain valve seats 24, 25 facing toward the high pressure ends of the working chambers and adapted to co-operate with check valves 26, 27, which open during the low pressure stroke of the pistons and close during the high pressure of the same, in the manner more fully set forth in Letters Patent, No. 1,627,810, May 10, 1927.

In front of the working chambers is arranged a replenishing chamber 28 which is adapted to hold a reserve supply of resistance liquid and from which the working chambers are fed with additional liquid to maintain the normal conditions in the working chambers.

In the present case the inner wall 30 of the working chambers also serves as the inner wall of the replenishing chamber and communication is established between the lower end of the replenishing chamber and the lower ends of one or both of the pressure chambers by means which permit liquid to flow from the replenishing chamber to either one or both of said pressure chambers but prevent flow of liquid in the reverse direction. The means for this purpose preferably consist of delivery ports or passages 29 arranged in the lower part of the wall 30 and each connecting the lower part of the replenishing chamber with the lower end of one of the working chambers and containing a valve seat 31 facing toward the respective working chamber and adapted to be engaged by a check valve 32, as shown in Figs. 1 and 2.

In order to secure the most efficient hydraulic shock absorbing effect from the resistance liquid the same should not contain an excess amount of air or gas because the presence of an undue amount of air in the oil or similar liquid has the effect of emulsifying the same.

When liquid is transferred from the replenishing chamber to the working chamber some air is also transferred with the liquid and this has heretofore been discharged from the upper ends of the working chambers into the upper end of the replenishing chamber by the pistons during their movement toward the upper end of these chambers. The means employed heretofore were liable to be disarranged and also become clogged so that the shock absorber would fail to operate most efficiently.

Means have therefore been provided of an improved character which embody the present invention and which are constructed as follows:

Adjacent to the upper end of one or both of said working chambers an opening 33 extends through the partition or wall 30 from side to side which is provided with an internal screw thread 34. In this opening is arranged a vent plug 35 having an external screw thread 12 which fits the thread of said opening and is preferably screwed into the same from the front side of this wall which faces the replenishing chamber. For convenience in thus assembling the screw plug 35 with the wall 30 the front end of the plug is provided with means for receiving a tool, for example, a transverse notch 36 with which a screw driver may be engaged for turning the screw plug.

The screw threads of the partition opening 33 and the vent plug 35 are so constructed that a gap is produced between the same which places the upper end of the respective working chamber in communication with the upper end of the replenishing chamber. This gap forms a helical vent port 37 through which air passes from the respective working chamber to the replenishing chamber when the liquid and the air are under pressure in said working chamber. This helical passage may be formed by either flattening the summit of the screw thread of the vent plug, as shown at 38 in Fig. 4, or by flattening the summit of the screw thread in the opening 33 in the partition or wall 30, as shown at 39 in Fig. 6. In either case the helical vent passage is formed between the summit of the screw thread on one of these members and the valley of the screw thread in the other member and still permits of securing a tight fit of the vent screw plug in the wall opening.

During the upward movement of either piston in its working chamber the same pushes the liquid ahead of it in the same direction together with any air which may be associated therewith. This air precedes the liquid and passes out of the respective working chamber, first through the respective helical passage and into the upper part of the replenishing chamber and thereafter some of the liquid which is being lifted by the respective piston also enters this helical passage during the continued upward movement of the latter. The air is permitted to pass with comparative freedom through the helical vent passage and thus moderately checks the movement of the pistons in the respective direction but the instant that the liquid enters the helical passage the latter becomes sealed by the liquid and no longer permits escape of fluid from the respective working chamber so that the working pistons during the final part of their upward strokes encounter considerably greater hydraulic resistance and exert a correspondingly greater shock absorbing effect at this time. During the subsequent downward movement of either of the pistons away from the respective vent opening the liquid seal in the latter prevents the respective piston from sucking air or gas from the replenishing chamber back into the respective working chamber and interfering with the proper operation of the absorber.

Owing to the helical form of the vent passage the same is of considerably greater length than a passage running directly from one side of the wall 30 to the other side, consequently a liquid seal of correspondingly greater length is provided which positively prevents the passage through the same of liquid from the working chambers to the replenishing chamber and also prevents passage through the same of air or gas from the replenishing chamber to the working chambers.

Moreover, by making the vent passages of helical form the cross-sectional area can be made considerably greater and thereby prevent the same from becoming clogged by any solid impurities in the oil or other hydraulic resistance medium.

By employing a screw joint for securing the vent plug in the respective wall member the same cannot be pushed out of place by the pressure of the air or liquid against the same and impairing the efficiency of the absorber.

To prevent rotation of the vent plug in the respective wall and possible displacement due to vibration of the car on which the absorber is mounted detent or locking means are provided which preferably consist in deforming the metal of a screw joint between the vent plug and the wall 30. As shown in Fig. 3 this deformation may consist of a punch prick or mark 40 which extends across the joint between the vent plug and the wall 30.

Instead of providing the vent plug and the wall 30 with co-operating screw threads, as shown in Figs. 1, 4 and 6, only one of these members may be provided with a helical groove, such construction being shown in Fig. 7 in which the wall 30 is provided with a cylindrical opening 331 and the plug 41 seated therein may be of corresponding cylindrical form and provided with a helical groove 42 in its periphery. Longitudinal displacement of the plug 41 may be prevented by upsetting its ends as shown at 43.

Although the helical form of vent passage is preferred on account of the ease of manufacture, the advantages of a lengthened vent passage are obtained by forming a tortuous devious or zig-zag groove 44 in a plug 45, as shown in Fig. 8, and securing the same in an opening in a wall similar to the structure shown in Fig. 7.

I claim as my invention:

1. A wall arranged between a working chamber and a replenishing chamber and provided with an opening having an internal screw thread, and a plug having an external screw thread engaging the internal thread of said opening, said plug being fixed in said opening and parts of the opposing faces of said threads being out of engagement with each other throughout their length to such an extent that a helical passage is formed between said plug and partition which will permit the passage of air from the working chamber to the pressure chamber but prevent the passage of liquid therethrough.

2. A wall arranged between a working chamber and a replenishing chamber and provided with an opening having an internal screw thread, and a plug having an external screw thread engaging the internal thread of said opening, the summit of the thread of said plug being flattened to form a helical passage between said wall and plug which connects said chambers and which has a sectional area permitting the passage of air but preventing the passage of liquid.

3. A wall arranged between a working chamber and a replenishing chamber and provided with an opening having an internal screw thread, and a plug having an external screw thread engaging the internal thread of said opening, the summit of the thread of said plug being flattened to form a helical passage between said wall and plug which connects said chambers and which has a sectional area permitting the passage of air but preventing the passage of liquid, said screw plug being held against turning in said opening by displacing a part of its thread.

4. A wall arranged between a working chamber and a replenishing chamber and provided with an opening having an internal screw thread, and a plug having an external screw thread engaging the internal thread of said opening, the summit of the thread of said plug being flattened to form a helical passage between said wall and plug which connects said chambers and which has a sectional area permitting the passage of air but preventing the passage of liquid, said screw plug being provided at one end with a notch and the threads of said plug and wall being displaced adjacent to said notch for preventing the plug from turning.

In testimony whereof I hereby affix my signature.

ANTHONY B. CASPER.